Nov. 30, 1965   T. BANERJEA ETAL   3,220,359
FREIGHT TRANSPORTATION SYSTEMS
Filed Sept. 18, 1963   9 Sheets-Sheet 1

INVENTORS
IRA C. EDDY
TARA BANERJEA
BY
Brangley, Baird, Clayton,
Miller & Vogel,
ATTYS.

Nov. 30, 1965     T. BANERJEA ETAL     3,220,359
FREIGHT TRANSPORTATION SYSTEMS
Filed Sept. 18, 1963     9 Sheets-Sheet 5

INVENTORS
IRA C. EDDY
TARA BANERJEA
BY
Prangley, Baird, Clayton,
Miller & Vogel, ATTYS.

Nov. 30, 1965  T. BANERJEA ETAL  3,220,359
FREIGHT TRANSPORTATION SYSTEMS
Filed Sept. 18, 1963  9 Sheets-Sheet 6

INVENTORS
IRA C. EDDY
TARA BANERJEA
BY
Prangley, Baird, Clayton,
Miller & Vogel,
ATTYS.

Nov. 30, 1965  T. BANERJEA ETAL  3,220,359
FREIGHT TRANSPORTATION SYSTEMS
Filed Sept. 18, 1963  9 Sheets-Sheet 7

INVENTORS
IRA C. EDDY
TARA BANERJEA
BY Prangley, Baird, Clayton,
Miller & Vogel,
ATTYS.

Nov. 30, 1965  T. BANERJEA ETAL  3,220,359
FREIGHT TRANSPORTATION SYSTEMS
Filed Sept. 18, 1963  9 Sheets-Sheet 9

INVENTORS
IRA C. EDDY
TARA BANERJEA
BY
Bragley, Baird, Clayton,
Miller & Vogel,
ATTYS.

UnitedStates Patent Office 3,220,359
Patented Nov. 30, 1965

3,220,359
FREIGHT TRANSPORTATION SYSTEMS
Tara Banerjea, Harvey, Ill., and Ira C. Eddy, Gary, Ind., assignors to General American Transportation Corporation, Chicago, Ill., a corporation of New York
Filed Sept. 18, 1963, Ser. No. 309,741
6 Claims. (Cl. 105—366)

The present invention relates to freight transportation sytems, and more particularly to such systems comprising a railway car of skeleton-like construction and a plurality of freight containers each of box-like construction, wherein the freight containers are selectively loaded and unloaded with respect to the railway car utilizing overhead hoisting equipment, such, for example, as a gantry crane, or the like.

In the system, each of the freight containers may be adapted for both railway transportation and roadway transportation in a well-known manner, whereby in this case, the central portion of the front end of the base of the container carries a downwardly projecting kingpin that is adapted to be selectively coupled and uncoupled by the usual fifth-whel mechanism carried by the rear end of a conventional road tractor and the rear end of the base of the container carries bogie-connecting structure that is adapted to be selectively connected and disconnected with respect to a conventional wheeled road bogie. Thus, when the freight container is to be converted from roadway operation to railway operation, the kingpin thereof is uncoupled from the fifth-wheel mechanism carried by the rear end of the associated road tractor and the bogie-connecting structure thereof is disconnected from the associated road bogie; whereby the container is then loaded by the gantry crane directly upon the associated railway car. On the other hand, when the freight container is to be converted from railway operation to roadway operation, the same is first unloaded by the gantry crane directly from the railway car, and then the bogie-connecting structure thereof is connected to the road bogie and the kingpin thereof is coupled to the fifth-wheel mechanism carried by the rear end of the road tractor. When the freight container is thus adapted for railway operation, it becomes in effect the body of the railway car; and when the freight container is thus adapted for roadway operation, it becomes in effect the body of the road semi-trailer.

Accordingly, it is a general object of the invention to provide a freight transportation system of the character described, that incorporates improved facility for selectively connecting and disconnecting the freight container to the railway car in the mounted position thereof upon the railway car, wherein the facility is especially adapted to accommodate selective overhead loading and unloading of the freight container with resepct to its mounted position by conventional overhead hoisting equipment.

Another object of the invention is to provide a freight transportation system comprising a railway car including longitudinally spaced-apart running gears having rail wheels, a longitudinally extending narrow beam bridging the running gears and defining by the top thereof a substantially horizontal platform, a pair of longitudinally extending members respectively resiliently mounted on the opposite outer sides of the beam for independent and limited cushioned longitudinal movements with respect thereto, wherein the members are respectively positioned adjacent to and below the opposite upper side edges of the platform and lie between the planes of the inner sides of the rail wheels of the running gears, two laterally extending bolsters independently removably mounted in longitudinally spaced-apart relation upon the platform, independent facilities for respectively selectively securing the bolsters in their mounted positions to the platform for longitudinal movements therealong, a freight container including a substantially rectangular base and removably mounted in a longitudinally extending direction upon the bolsters respectively positioned below the opposite ends of the base, independent facilities for respectively selectively locking the bolsters in the mounted position of the container to the respectively associated ends of the base, whereby the bolsters in their mounted and secured positions and the container in its mounted and locked position constitute a unit movable longitudinally along the platform, and independent facilities for respectively selectively connecting the bolsters to the members, whereby the members afford the connected unit protection against the transmission thereto of severe longitudinal shocks from the platform.

Another object of the invention is to provide a freight transportation system of the character described, wherein the freight container includes a body having a rear opening and provided with a pair of rear doors that are swingable outwardly into open positions, and wherein the bolsters are constructed and arranged so that the container rear doors may swing over the bolster at the rear of the container while the container is mounted upon the platform of the railway car.

Another object of the invention is to provide a freight transportation system of the character described, wherein each of the bolsters is of elongated form including a substantially horizontal bottom section supporting the adjacent bottom end of the base of the associated freight container, a substantially vertical end section engaging the adjacent lower outer end of the base mentioned, and a pair of upstanding side sections respectively positioned adjacent to the opposite sides of the adjacent end of the base mentioned, wherein the upper portion of the end section is longitudinally outwardly flared to accommodate longitudinal centering adjustment of the adjacent end of the base mentioned, and wherein the upper portions of the side sections are oppositely laterally outwardly flared to accommodate lateral centering adjustment of the adjacent end of the base mentioned, which longitudinal and lateral centering adjustment of the adjacent end of the base mentioned are highly desirable incident to overhead loading of the container upon the associated railway car.

A further object of the invention is to provide a railway car especially adapted to carry removable freight containers, wherein the railway car is of the elongated narrow beam type described and including a pair of elongated longitudinally extending structural members arranged in laterally spaced-apart relation and defining an elongated longitudinally extending narrow pocket therebetween and having a corresponding elongated longitudinally extending narrow top opening into the pocket, the tops of the members respectively carrying a pair of flanges defining a substantially horizontal platform on top of the beam, a pair of cradle structures arranged within the pocket and disposed in longitudinally spaced-apart relation with respect to each other, and a pair of elongated portable bolsters, each of the bolsters having a width between the opposite sides thereof that is somewhat narrower than the top opening so that the bolster when oriented in the longitudinal direction may be passed in either direction through the top opening between the interior and the exterior of the pocket, each of the bolsters having a length between the opposite ends thereof that is somewhat greater than the width of the platform so that the bolster when disposed exteriorly of the pocket and oriented in the lateral direction may be supported upon the platform with the opposite ends thereof respectively projecting laterally outwardly beyond the opposite sides of the platform, the pair of bolsters having a corresponding pair of storage positions wherein they are oriented in the longitudinal direction and aranged within the pocket and respectively supported upon the pair of cradle structures, the pair of bolsters having a corresponding pair of coordinate active positions wherein they are oriented in the lateral direction and arranged exteriorly of the pocket and respectively supported upon the platform and located in predetermined longitudinally spaced-apart relation, the pair of bolsters in their coordinate active positions being adapted respectively to receive and to support the opposite ends of a freight container mounted on top of the platform, each of the bolsters carrying first locking mechanism for selectively locking and unlocking the bolster in its active position to the beam, each of the bolsters carying second locking mechanism for selectively locking and unlocking the bolster to the adjacent end of the supported freight container.

A further object of the invention is to provide a railway car of the type described, and further comprising a pair of jacks arranged within the pocket and respectively associated with the cradle structures, wherein each of the jacks is arranged to elevate and to lower the associated bolster with respect to the adjacent cradle structure so as to facilitate the movement of the bolster between its storage and active positions.

A further object of the invention is to provide a railway car of the character described, wherein each of the jacks is manually operated and provided with an operating handle disposed in the pocket and accessible from the exterior through the top opening.

A further object of the invention is to provide a railway car of the character described, wherein each of the bolsters carries a pair of spaced-apart rollors adapted respectively to engage the flanges so as to accommodate ready rolling of the bolster along the platform incident to movements of the bolster between its active and inactive positions.

A further object of the invention is to provide a railway car of the character described, wherein each of the bolsters is constructed and arranged removable to receive a common handle-bar, whereby the single handle-bar may be detachably connected to any one of the bolsters to facilitate the rolling movement thereof along the platform between its storage and active positions.

A still further object of the invention is to provide a railway car of the character described, wherein the required manipulation, movements and handling of the bolsters may be easily carried out by one person, and wherein the bolsters when not in use may be stored, together with the manipulating and handling tools, directly in the hollow beam of the railway car, so as to prevent accidentally loss or storage in improper locations of the bolsters and the tools, when the bolsters are not required in other uses of the railway car.

Further features of the invention pertain to the particular arrangement of the elements of the freight transportation system and of the railway car, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
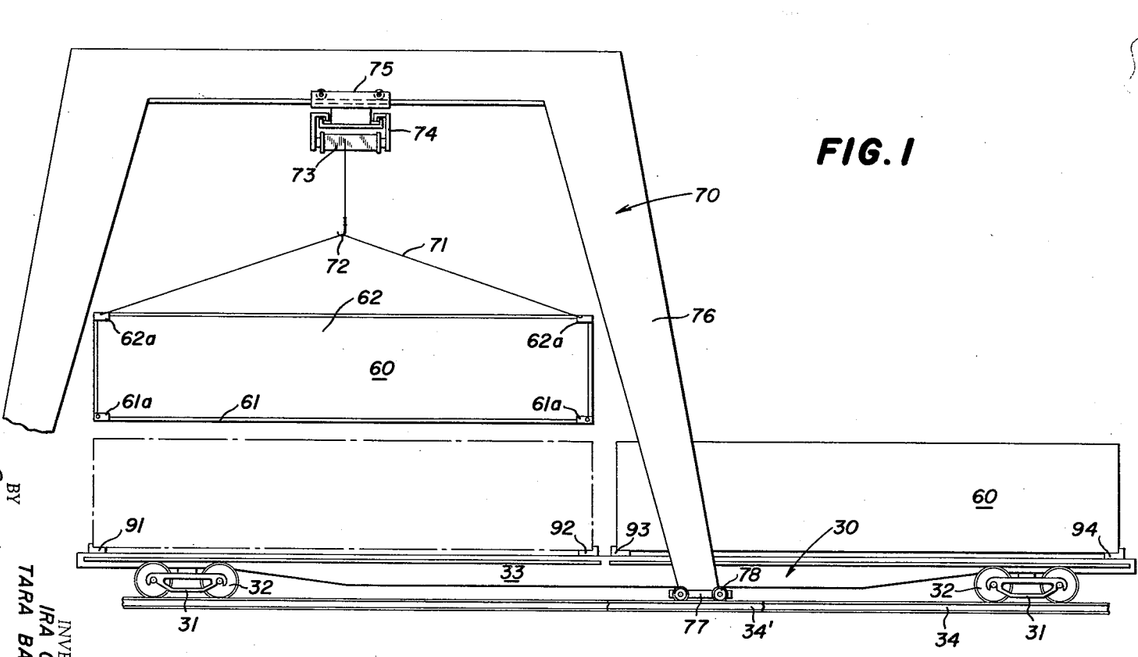
FIGURE 1 is a side elevational view, partly broken away, of a freight transportation system embodying the present invention and including a railway car and two substantially identical freight containers, and also illustrating a gantry crane that is employed in the selective overhead loading and overhead unloading of each of the containers with respect to the railway car.
Figure 2:
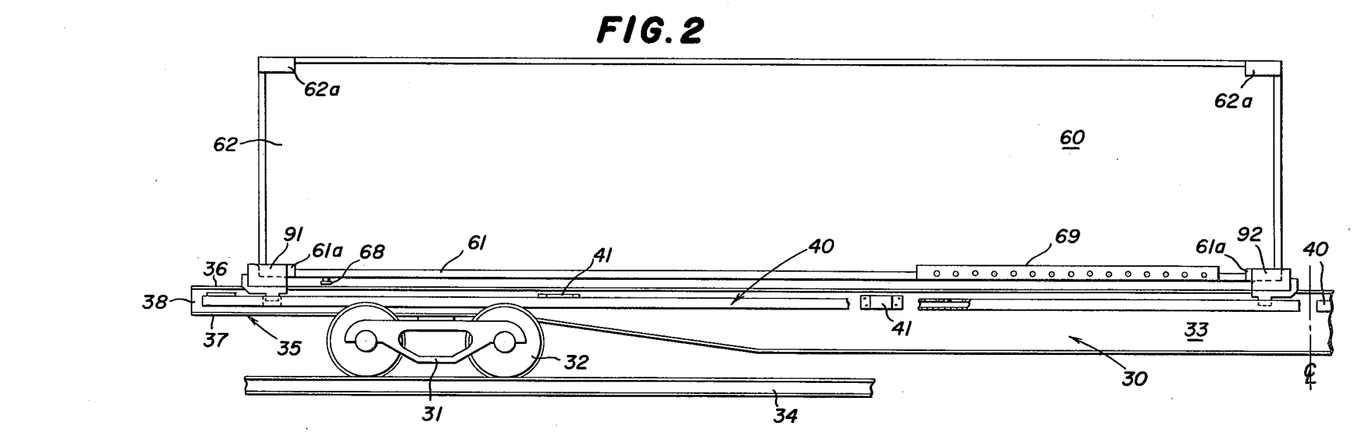
FIG. 2 is an enlarged side elevational view, partly broken away, of one end portion of the railway car and the associated freight container carried thereby, as shown in FIG. 1.
Figure 3:
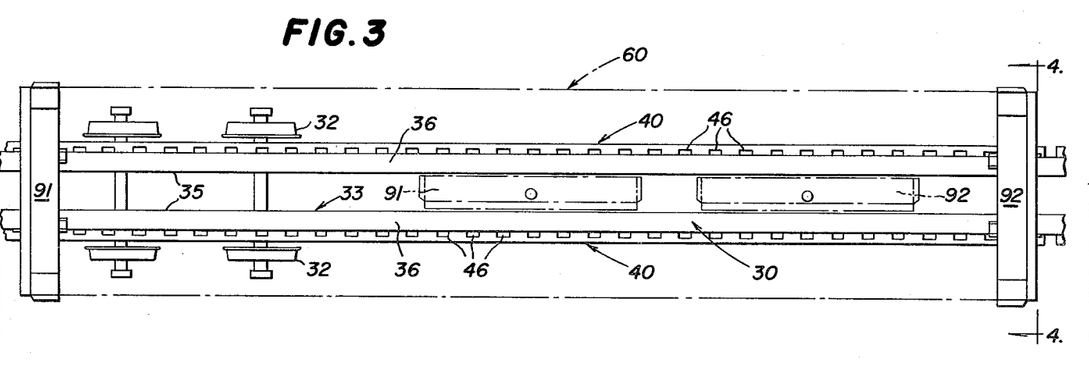
FIG. 3 is an enlarged plan view of the one end portion of the railway car, as shown in FIG. 2, and illustrating two bolsters carried thereby for use in mounting the freight container thereupon.

Referring now to FIGS. 1 to 3, inclusive, of the drawings, the freight transportation system there illustrated, and embodying the features of the present invention, essentially comprises a railway car 30 and two freight containers 60, the two containers 60 being selectively loaded and unloaded with respect to the two corresponding ends of the railway car 30 by overhead hoisting equipment, such, for example, as the gantry crane 70 illustrated.

Preferably, the railway car 30 is of the construction and arrangement of that disclosed in the copending application of Deodat Clejan, Serial No. 226,429, filed September 26, 1962, now Patent No. 3,168,876; which railway car 30 is of skeleton-like construction comprising a pair of longitudinally spaced-apart running gears or trucks 31 carrying flanged rail wheels 32 and of standard rail gauge, and an elongated narrow beam or center sill 33 extending longitudinally between and in bridging relation with the trucks 31, the center sill 33 lying entirely between the planes of the inner sides of the rail wheels 32, as clearly illustrated in FIG. 3. The rail wheels 32 are adapted to engage the rails 34 of an associated railway track, and the center sill 33 is of fish-belly configuration, as shown in FIGS. 1 and 2. Also, the center sill 33 is of composite construction, including a pair of laterally spaced-apart and longitudinally extending I-beams 35, each of the I-beams 35 having the usual top and bottom flanges 36 and 37 and connecting web 38. In the center sill 33 the top flanges 36 of the two I-beams 35 are arranged in a substantially horizontal plane to define a corresponding substantially horizontal platform for supporting the containers 60; and also the top flanges 36 of the two I-beams 35 respectively define the two rails of an auxiliary track extending longitudinally along the top of the center sill 33 and from end to end thereof; which auxiliary track is adapted to support and to guide rolling loads that may be mounted upon the top of the center sill 33. Also, the railway car 30 comprises, as illustrated in FIGS. 2 and 3, a pair of longitudinally extending members 40 respectively resiliently mounted on the opposite outer sides of the I-beams 35 for limited and cushioned longitudinal movements with respect thereto; which members 40 also lie entirely between the inner sides of the rail wheels 32, as clearly illustrated in FIG. 3. Preferably, each of the members 40 is formed in two sections, as illustrated in FIG. 2, due to the length thereof; however, each of the members 40 may be formed as a single long strip, if desired. Specifically as shown in FIG. 2, each elongated section of each member 40 extends substantially one-half of the length of the adjacent I-beam 35 and is secured to the web 38 thereof by a plurality of longitudinally spaced-apart resilient devices 41, four of the devices 41 being illustrated.

Figure 13:
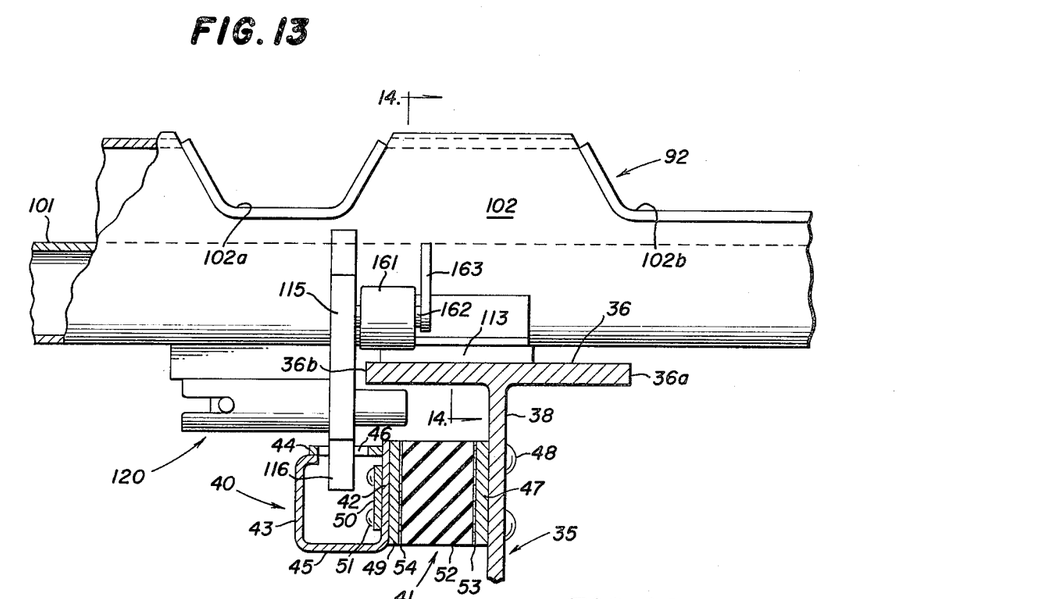
FIG. 13 is a greatly enlarged rear view of the portions of the bolster and of the center sill enclosed by the circle 13 in FIG. 4.
Figure 15:
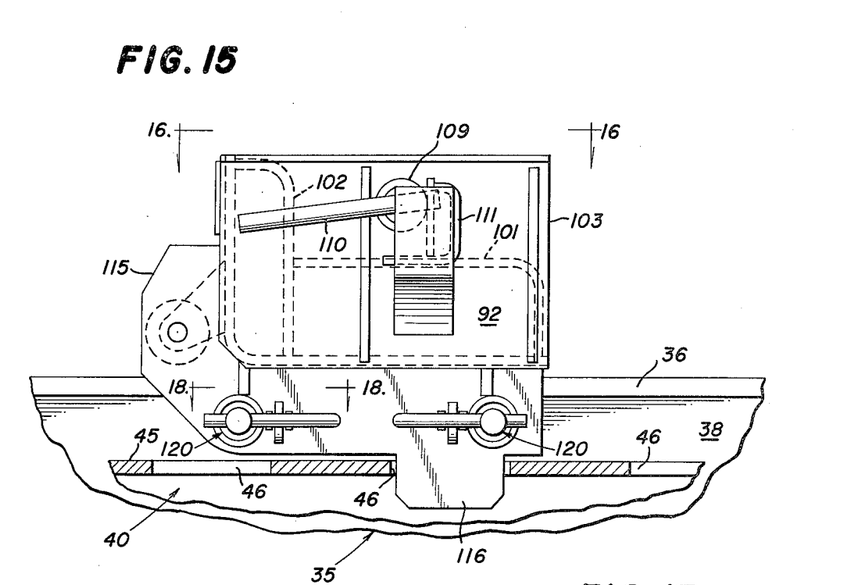
FIG. 15 is a greatly enlarged fragmentary side view of the center sill and the adjacent end of the bolster, this view being taken in the direction of the arrows along the line 15—15 in FIG. 6.

As shown in FIGS. 3, 13 and 15, the member 40 is of elongated hollow box-like configuration, including connected inner and outer walls 42 and 43 and top and bottom walls 44 and 45, the top wall 44 having a plurality of longitudinally spaced-apart substantially rectangular slots 46 formed therein that are employed for the purpose of securing in place the associated mounted container 60, as explained more fully hereinafter. Each of the devices 41 comprises an inner plate 47 rigidly secured to the adjacent web 38 of the associated I-beam 35 by rivets 48, or the like, an outer plate 49 rigidly secured to the adjacent inner wall 42 of the associated member 40 by a strap 50 and by rivets 51, or the like, and an interposed block 52 of elastomeric material, such, for example, as live rubber. The outer surface of the inner plate 47 is securely bonded to the adjacent inner surface of the block 52, as by vulcanizing or cementing, as indicated by the layer of material 53; and, likewise, the inner surface of the outer plate 49 is securely bonded to the adjacent outer surface of the block 52, as by vulcanizing or cementing, as indicated by the layer of material 54. Accordingly, longitudinal movement of the member 40 relative to the associated I-beam 35 subjects the four blocks 52 respectively incorporated in the four mounting devices 41 to sheer stresses; whereby the devices 41 resist and damp such movements of the member 40 effecting limited and cushioned movement thereof with respect to the associated I-beam 35. Not only do the devices 41 act as resilient shock-absorbers between the I-beam 35 and the mounted member 40, when the member 40 is moved longitudinally in either direction with respect to its normal position upon the associated I-beam 35, but the devices 41 act to restore the member 40 into its normal position following a longitudinal displacement thereof from its normal position.

As best shown in FIG. 13, the top flange 36 of the I-beam 35 comprises the usual inwardly projecting flange section 36a and the usual outwardly projecting flange section 36b; and the member 40 is arranged closely adajcent to and below the outwardly projecting flange section 36b. In fact, the members 40 project laterally outwardly beyond the outer edges of the outer flange sections 36b so that the slots 46 provided in the top walls 44 of the members 40 are readily accessible laterally outwardly of the top of the platform defined by the top flanges 36 of the I-beams 35 upon the top of the center sill 33, thereby to facilitate the connecting of the container 60 in its mounted position upon the platform mentioned to the members 40, as explained more fully hereinafter.

Figure 9:
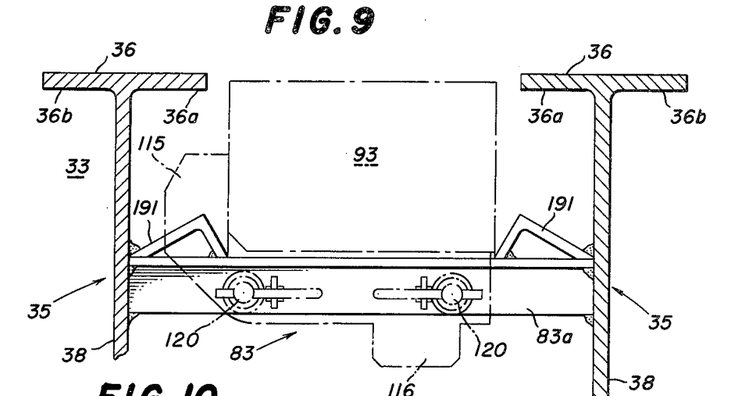
FIG. 9 is a further enlarged fragmentary lateral vertical sectional view of the railway car, this view being taken in the direction of the arrows along the line 9—9 in FIG. 8.
Figure 10:
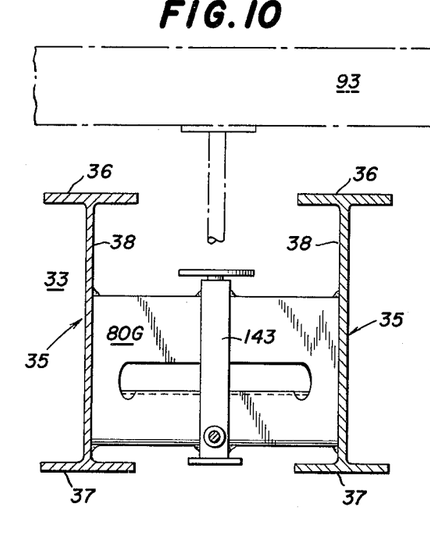
FIGS. 10, 11 and 12 are successive views, similar to FIG. 9, and respectively taken in the direction of the arrows along the respective lines 10—10, 11—11 and 12—12 in FIG. 8.

The two longitudinally extending I-beams 35 of the center sill 33 are tied together by a plurality of laterally extending and longitudinally spaced-apart tie members 80A, 80B, 80C, 80D, 80E, 80F, 80G, 80H, 80I and 80J, thereby to prevent spreading of the I-beams 35 and to lend additional rigidity to the center sill 33, as best shown in FIGS. 7, 8, 10, 11 and 12, the tie members 80A, etc., being rigidly secured in place, as by welding, between the opposite ends thereof and the adjacent webs 38 of the I-beams 35. Also, the arrangement of the I-beams 35 defines an elongated narrow pocket therebetween in the center sill 33 that is accessible from the exterior through the elongated narrow top opening defined between the inwardly directed flange sections 36a, as best shown in FIG. 9; whereby the pocket mentioned constitutes a tool-chest or receptacle that is employed for this purpose, as explained more fully below. Specifically, a pair of cradle structures are arranged in each end of the pocket formed in the center sill 33. A first of the cradle structures 81 is operatively associated with the tie member 80B, and includes the pair of laterally extending and longitudinally spaced-apart cradle elements 81a disposed on opposite sides of the tie member 80B; a second of the cradle structures 82 is operatively associated with the tie member 80D, and includes the pair of laterally extending and longitudinally spaced-apart cradle elments 82a disposed on opposite sides of the tie member 80D; a third of the cradle structures 83 is operatively associated with the tie member 80G, and includes the pair of laterally extending and longitudinally spaced-apart cradle elements 83a disposed on opposite sides of the tie member 80G; and a fourth of the cradle structure 84 is operatively associated with the tie member 80I, and includes the pair of laterally extending and longitudinally spaced-apart cradle elements 84a disposed on opposite sides of the tie member 80I. The four cradle structures 81, 82, 83 and 84 are adapted to receive and to support, respectively, four individual bolsters 91, 92, 93 and 94, as best shown in FIGS. 7, 8, 9 and 11. The pair of bolsters 91, 92 are adapted to support the container 60 arranged on the left-hand side of the railway car 30; and the pair of bolsters 93, 94 are adapted to support the container 60 arranged on the right-hand side of the railway car 30; all as shown in FIGS. 1, 2 and 3, and as explained more fully hereinafter.

Figure 7:
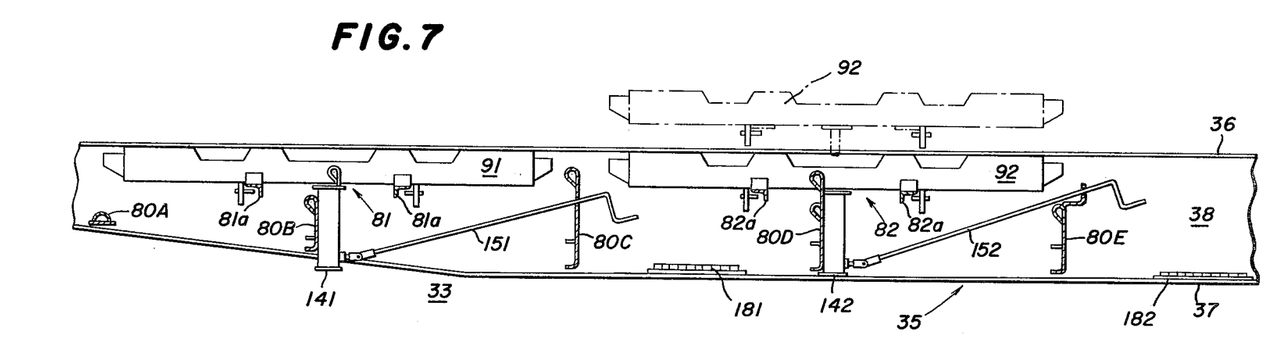
FIG. 7 is an enlarged fragmentary central longitudinal vertical sectional view of the left-hand end of the railway car, as shown in FIG. 1.
Figure 8:
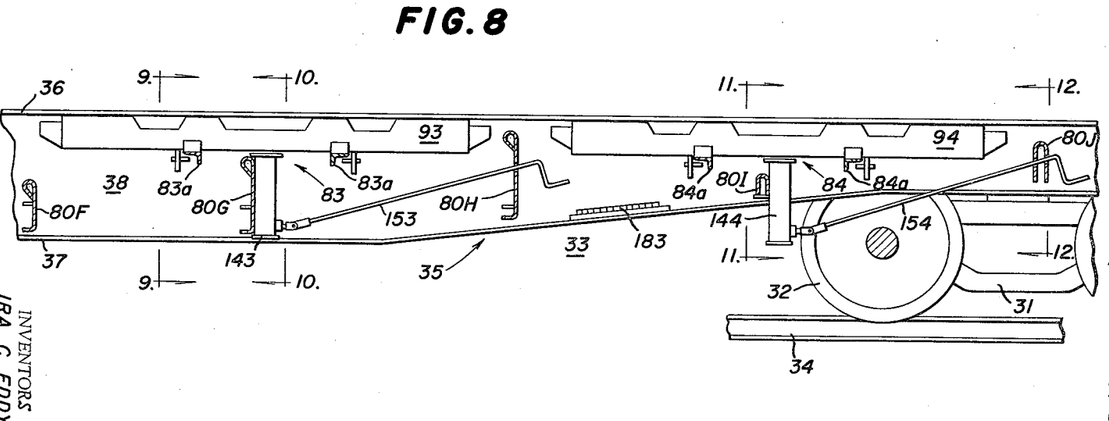
FIG. 8 is a view similar to FIG. 7, of the right-hand end of the railway car.
Figure 11:
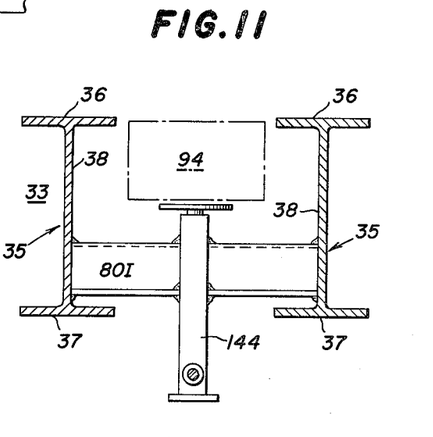
Figure 12:
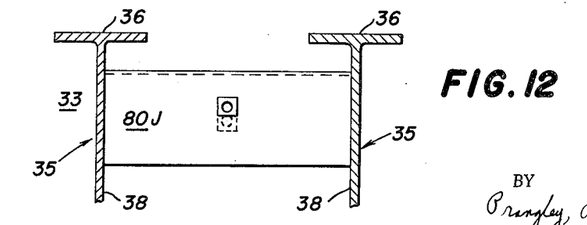

The bolsters 91, 92, 93 and 94 are identical; and each bolster 91, etc., has a storage position wherein it is arranged within the pocket provided in the center sill 33 and supported by the corresponding cradle structure 81, etc. Also, each of the bolsters 91, etc., has an active position wherein it is arranged exteriorly of the pocket provided in the center sill 33 and supported by the top flanges 36 of the I-beams 35 of the center sill 33. Each of the bolsters 91, etc., has a width between the opposite sides thereof that is somewhat less than the width of the top opening between the inwardly directed flange sections 36a; whereby the bolster 91, when oriented in the longitudinal direction, may pass in either direction through the top opening mentioned and between its storage and active positions, as indicated in FIGS. 7, 9 and 11. Also, each of the bolsters 91, etc., has a length between the opposite ends thereof that is substantially greater than the width of the platform defined by the top flanges 36 of the I-beams 35 of the center sill 33, whereby the bolster 91, when oriented in the lateral direction, spans and overhangs the opposite sides of the platform mentioned, as best shown in FIG. 3. Further, when the individual bolsters 91 and 92 of the pair occupy their active positions, as indicated in FIG. 3, these active positions are also coordinate, so as to establish a predetermined longitudinal spacing therebetween in order nicely to receive therebetween the associated container 60 in its supported position; this longitudinal spacing of the bolsters 91 and 92 in their coordinate active positions being established by the length of the container 60, since the container 60 must fit precisely between the bolsters 91 and 92 respectively disposed at the opposite ends thereof, as best shown in FIG. 2.

The container 60 is of elongated box-like configuration having a length that is only somewhat less than one-half of the center sill 33 of the railway car 30, so that the two containers 60 may be readily mounted in end-to-end relation and in longitudinally spaced-apart positions upon the corresponding end portions of the center sill 33, as indicated in FIGS. 1 to 3, inclusive. The container 60 comprises an elongated substantially rectangular lower base 61 and an upper hollow body 62 rigidly secured together and forming a unitary strong rigid structure, the body 62 defining therein a lading chamber, not shown, that is provided with a rear doorway structure therein affording access into the lading chamber mentioned. Also, the rear doorway structure mentioned carries a pair of rear doors, indicated at 63A and 63B in FIG. 4; which rear doors 63A and 63B are complementary to each other and completely close the rear doorway, when they occupy their closed positions. Preferably, the body 62 and the rear doors 63A and 63B incorporate heat-insulating material; whereby the container 60 may be of the refrigerated type. The two rear doors 63A and 63B swing outwardly into open positions with respect to the rear doorway to afford access into lading chamber mentioned, so as to accommodate loading and unloading of the lading with respect to the lading chamber. For the purpose of restraining the rear doors 63A and 63B in their closed positions the rear door 63A carries a pair of lock bars 64A and 65A and the rear door 63B carries a pair of lock bars 64B and 65B; the lock bars noted are of conventional construction and cooperate with respectively associated keepers 66a, 67a, 66b and 67b carried by the rear end of the base 61 in the usual manner. The container 60 is of strong rigid structure, as previously noted, so as to accommodate ready loading and unloading thereof with respect to the railway car 30 utilizing the gantry crane 70. Also, the strong rigid structure of the container 60 accommodates vertical stacking of two or more of the containers 60 on a suitable support for storage purposes.

Figure 14:
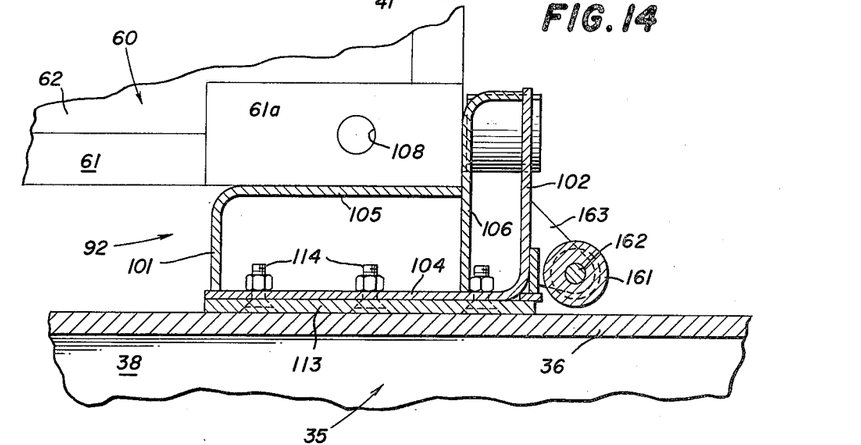
FIG. 14 is a greatly enlarged longitudinal sectional view of the elements shown in FIG. 13, this view being taken in the direction of the arrows along the line 14—14 in FIG. 13.

In the container 60, the front end of the base 61 is further reinforced by structure, not shown; this structure carries a low depending king pin 68 that may be selectively coupled and uncoupled by the usual fifth-wheel mechanism carried by the rear end of a road tractor, not shown, in a conventional manner. Also, the rear portions of the opposite sides of the base 61 respectively carry a pair of rail-like structures 69 that are adapted to be selectively connected and disconnected with respect to a conventional wheeled road bogie, not shown, when the same is disposed below and in supporting relation with the rear end of the container 60; all in a conventional manner. Referring to FIGS. 2 and 14, the base 61 of the container 60 comprises four corner castings 61a and the roof of the container 60 comprises four corner castings 62a; which corner castings 61a and 62a are employed in securing the container 60 in mounted position upon the railway car 30, in handling the container 60 with the gantry crane 70, in securing together two of the containers 60 in stacked relation, etc.

Specifically, as indicated in FIG. 1, the four top corner castings 62a may be employed to anchor in place the four extremities of sling structure 71 of cable-like form that is carried by the hook 72 of the gantry crane 70, thereby to accommodate lifting of the container 60 in effecting loading and unloading thereof with respect to the railway car 30, as shown in FIG. 1. Further, the gantry crane 70 comprises the usual hoisting mechanism 73 carrying the crane hook 72, as well as a laterally movable carriage 74 carrying the hoisting mechanism 73. The carriage 74 is mounted upon a longitudinally movable carriage 75 mounted on the top central portion of the crane structure 76; and the lower extremities of the crane structure 76 carry the usual foot structures 77 that carry flanged wheels 78 engaging and guiding upon other longitudinally extending rails 34' disposed laterally outwardly of the rails 34 upon which the railway car 30 is mounted. Thus, it will be understood that in the gantry crane 70, the crane structure 76 is movable longitudinally along the rails 34' in spanning relation with the railway car 30 mounted upon the rails 34, that the carriage 74 carrying the hoisting mechanism 73 may be moved laterally, as required, upon the beam 75, and that the hoisting mechanism 73 carried by the carriage 74 may selectively raise and lower the crane hook 72, as required, with respect to the carriage 75. Of course, the crane hook 72 raises and lowers the container 60 through the sling structure 71; whereby any one of the containers 60 may be loaded and unloaded with respect to either end of the center sill 33 of the railway car 30, as required, in an obvious manner.

Figures 16, 17:
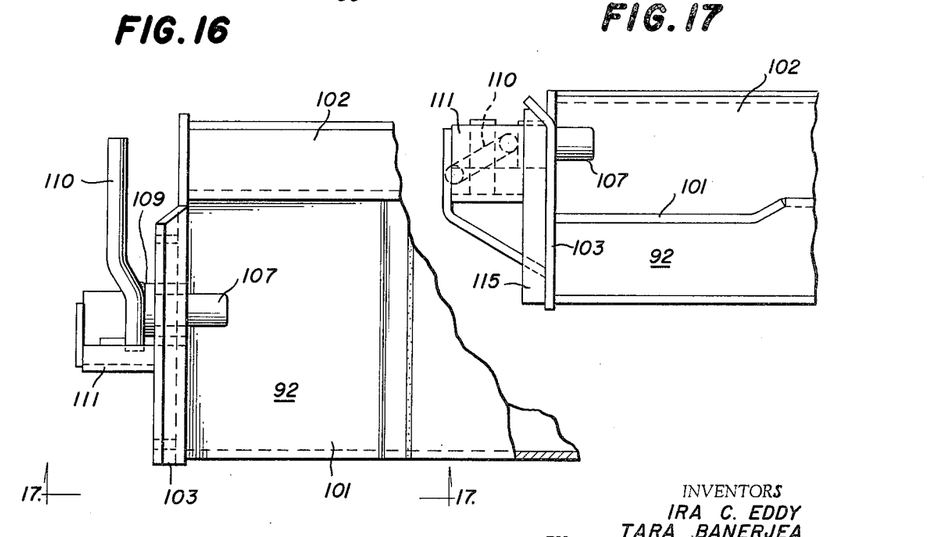
FIG. 16 is a greatly enlarged fragmentary plan view of the bolster, this view being taken in the direction of the arrows along the line 16—16 in FIG. 15.
FIG. 17 is a greatly enlarged fragmentary front view of the bolster, this view being taken in the direction of the arrows along the line 17—17 in FIG. 16.

As previously noted the bolsters 91, 92, 93 and 94 are of identical construction and arrangement; whereby the bolster 92 comprises, as shown in FIGS. 4, 5, 6, 13, 14, 15, 16 and 17, an elongated substantially horizontal hollow base section 101, an elongated substantially vertical hollow end section 102 and a pair of spaced-apart side sections 103. Thus, the bolster 92 has a cross section that is substantially L-shaped, as best shown in FIG. 14. The sections 101 and 102 includes a common substantially L-shaped outer plate 104; the base section 101 includes a substantially L-shaped plate 105; and the end section 102 includes a substantially L-shaped plate 106. The front and top portions of the plate 106 are rounded at the junction therebetween so as to accommodate longitudinal adjustments of the associated end of the container 60 incident to overhead loading thereof; whereby the end section 102 is in effect longitudinally outwardly flared for the purpose mentioned. The side sections 103 are oppositely laterally outwardly flared so as to accommodate lateral adjustments of the associated end of the container 60, as best shown in FIG. 16. When the end of the container 60 is supported upon the bloster 92, as shown in FIG. 14, the bottom of the end of the container 60 rests upon the top surface of the base section 101, and the outer end portion of the end of the container 60 engages the front surface of the end section 102, and outer side portions of the end of the container 60 are respectively disposed closely adjacent to the inner surface of the side section 103.

For the purpose of locking the bolster 92 to the adjacent end of the container 60, the end sections 103 respectively carry a pair of lock pins 107 that respectively cooperate with a pair of lock holes 108 respectively formed in the outer sides of the adjacent corner castings 61a, as best shown in FIGS. 14, 15, 16 and 17. Each of the lock pins 107 has a lock position in which it is thrust inwardly into the lock hole 108 provided in the associated corner castings 61a, and an unlock position in which it is withdrawn outwardly from the adjacent lock hole 108. Each of the lock pins 107 terminates in an enlarged outer head 109 to which there is secured a handle 110. The handle 110 is arranged in cooperating relation with cam mechanism 111 carried on the outer surface of the adjacent side section 103; whereby rotation of the handle 110 into its horizontal position, as shown in FIGS. 15 and 16, causes the cam mechanism 111 to move the lock pin 108 into its lock position, and rotation of the handle 110 into its vertical position causes the cam mechanism 111 to move the lock pin 108 into its unlock position.

Figure 4:
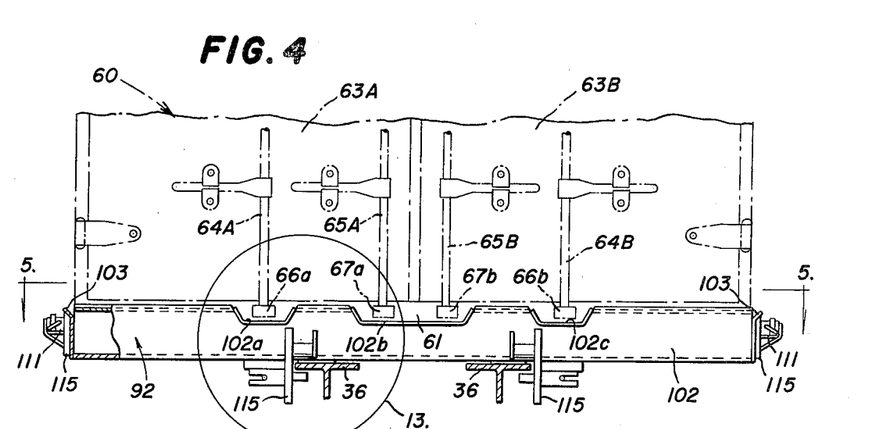
FIG. 4 is a further enlarged fragmentary end elevational view of the rear end of the freight container and a rear view of the associated bolster, this view being taken in the direction of the arrows along the line 4—4 in FIG. 3.
Figure 5:
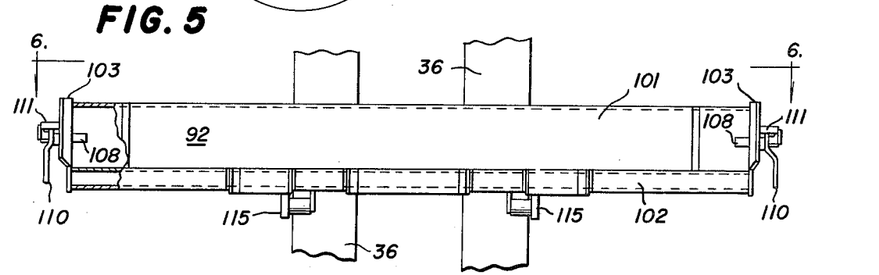
FIG. 5 is a further enlarged plan view of the bolster, this view being taken in the direction of the arrows along the line 5—5 in FIG. 4.
Figure 6:
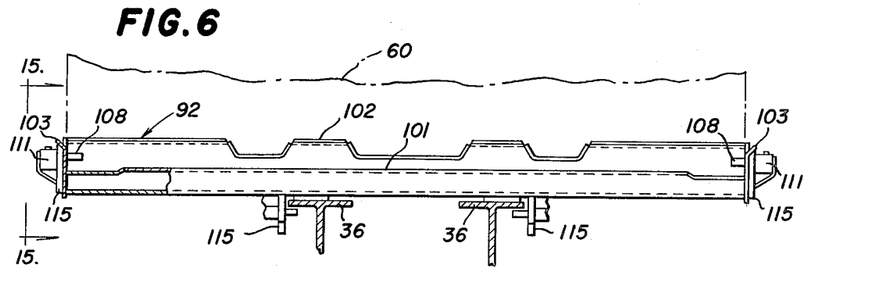
FIG. 6 is a further enlarged front view of the bolster, this view being taken in the direction of the arrows along the line 6—6 in FIG. 5.

As best shown in FIGS. 13 and 14, the bolster comprises a pair of spaced-apart skid or wear plates 113 that are carried by the bottom surface of the base section 101 and secured in place by suitable bolts 114; which skid plates 113 respectively engage the upper surfaces of the top flanges 36 of the I-beams 35 of the center sill 33, thereby to mount the bolster 92 for longitudinal sliding movements along the center sill 33. Also, as best shown in FIG. 4, three laterally spaced-apart notches 102a, 102b and 102c are formed in the end section 102 of the bolster 92, so as to accommodate the passage of the lower ends of the lock bars 64A, 65A, 65B and 64B; whereby the rear doors 63A and 63B may be moved into their open positions, while the container 60 occupies its mounted position upon the railway car 30.

For the purpose of restraining the bolster 92 in its supported position on the platform provided by the top of the center sill 33, the opposite side sections 103 of the bolster 92 carry a pair of depending attachment plates 115, as best shown in FIGS. 4, 6, 13, 15 and 17; which plates 115 are respectively disposed adjacent to and laterally outwardly from the outer flange sections 36b, as shown in FIG. 13 Each of the plates 115 carries a pair of locking devices 120 arranged in longitudinally spaced-apart relation; and each of the locking devices 120 has lock and unlock positions with respect to the adjacent flange section 36b, as shown in FIG. 13.

Figure 18:
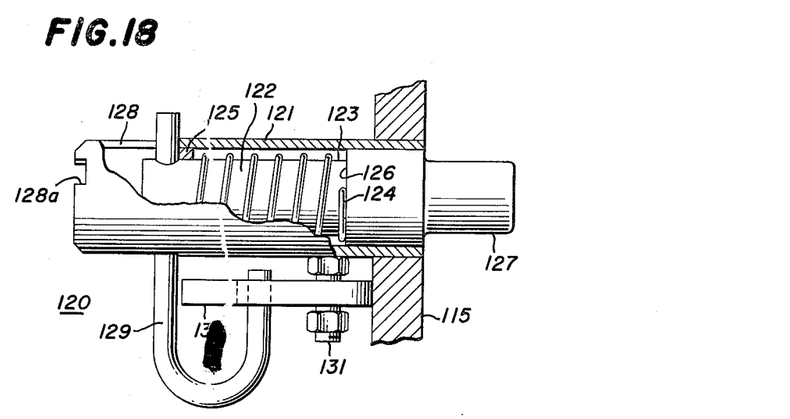
FIG. 18 is a greatly enlarged plan view, partly broken away, of one of the two locking mechanisms carried by the end of the bolster, as shown in FIG. 15, this view being taken in the direction of the arrows along the line 18—18 in FIG. 15.
Figure 19:
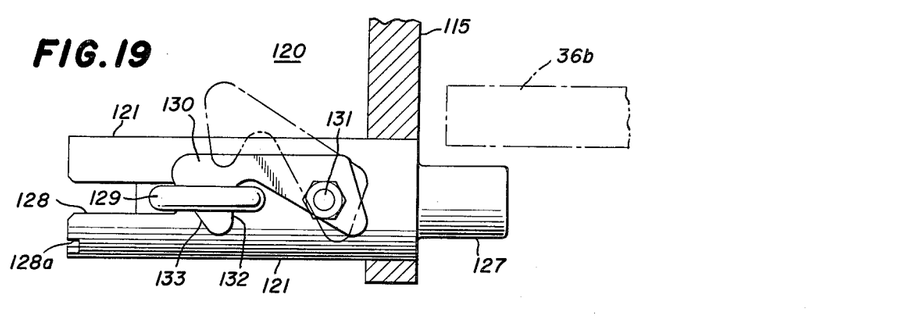
FIG. 19 is a side view of the locking mechanism, as shown in FIG. 18.
Figure 20:
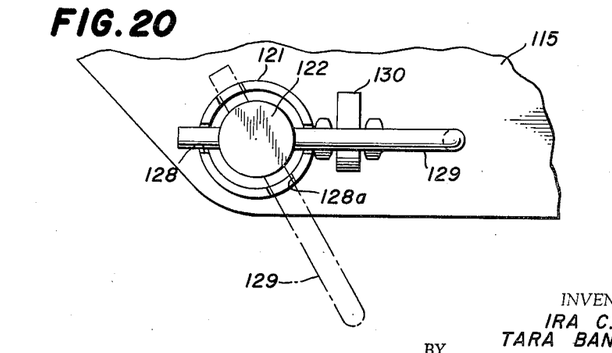
FIG. 20 is an end view of the locking mechanism, as shown in FIG. 18.

The locking devices 120 are identical; and, as best shown in FIGS. 18 to 20, inclusive, each of the locking devices 120 comprises a substantially cylindrical barrel 121 rigidly secured at the inner end thereof in a hole provided in the associated plate 115, the barrel 121 being disposed in a substantially horizontal position, when the bolster 92 occupies its mounted position upon the center sill 33. A plunger 122 is slidably mounted in the barrel 121 and includes a section 123 of reduced diameter that is housed in the barrel 121. A helical coil spring 124 surrounds the section 123 of the plunger 122 and acts at one end thereof against an abutment 125 carried by an outer portion of the barrel 121 and acts at the other end thereof against a shoulder 126 carried by an inner portion of the plunger 122. The spring 124 is of the compression type, whereby it biases the plunger 122 inwardly with respect to the barrel 121, so as to project the extreme inner or locking end 127 of the plunger 122 into its lock position with respect to the adjacent laterally outwardly directed section 36b of the top flange 36 of the associated I-beam 35, when the bolster 92 occupies its mounted position upon the center sill 33, as illustrated in FIG. 19. The extreme outer end of the barrel 121 is provided with a cross-slot 128; and the extreme outer end of the plunger 122 is provided with a rod-like handle 129 that cooperates with the slot 128.

The plunger 122 may be moved outwardly within the barrel 121 by pulling outwardly upon the handle 129; whereby the locking end 127 of the plunger 122 is retracted into its unlock position with respect to the laterally outwardly directed section 36b of the adjacent top flange 36; whereupon the handle 129 is positioned at the extreme outer end of the barrel 121 and clear of the cross-slot 128 therein; and whereby the spring 124, is further compressed between the abutments 125 and 126. At this time, the handle 129 may be restrained in its outward position, so as to retain the locking end 127 of the plunger 122 in its unlock position, merely by rotating the same out of alignment with the cross-slot 128 and into alignment with an aligned pair of angularly displaced notches 128a formed in the outer end of the barrel 121. In order to return the locking end 127 of the plunger 122 back into its lock position, the handle 129 is pulled outwardly to disengage the notches 128a and then rotated back into alignment with the cross-slot 128 and released; whereby the spring 124 returns the plunger 122 inwardly projecting the locking end 127 thereof into its lock position and causing the handle 129 to ride into the cross-slot 128, as shown in FIG. 18.

Also, the locking device 120 comprises a gravity-actuated latch 130 that is pivotally mounted upon a stud 131 carried by the side of the barrel 121 adjacent to the plate 115. More particularly, the front portion of the latch 130 has a downwardly opening or keeper recess 132 formed therein that cooperates with the handle 129; and also, the front end of the latch is provided with a downwardly and inwardly sloping surface 133 thereon that also cooperates with the handle 129. Specifically, when the handle 129 in its outer position is rotated into alignment with the cross-slot 128 and then released, the same is moved inwardly with the plunger 122 by the spring 124, as previously noted. As the handle 129 moves inwardly in the cross-slot 128, it engages the surface 133 provided upon the front end of the latch 130, so as first to pivot the latch 130 upwardly about the stud 131 and then to move under and in alignment with the keeper recess 132. The latch 130 is returned downwardly by gravity, whereby the keeper recess 132 therein rides over the handle 129, as shown in FIG. 19, when the locking end 127 of the plunger 122 is in its lock position. Of course, it is necessary manually to raise the latch 130 against the bias of gravity in order to move the handle 129 outwardly to actuate the locking end 127 of the plunger 122 into its unlock position. Accordingly, the arrangement of the latch 130 positively prevents unintentional operation of the locking end 127 of the plunger 122 into its unlock position.

For the purpose of connecting the bolster 92 in its mounted position upon the platform defined by the top of the center sill 33 to the members 40 resiliently mounted upon the opposite outer sides of the I beams 35 of the center sill 33, the two plates 115 respectively carry two downwardly projecting connecting lugs 116 that respectively extend into two of the slots 46 respectively provided in the two top walls 44 of the two members 40, as shown in FIGS. 13 and 15; whereby the opposite ends of the bolster 92 are thus securely attached to the members 40 and via the resilient devices 41 to the center sill 33.

Considering now the general mode of operation of the freight transportation system to effect loading of the container 60 upon the open left-hand end of the railway car 30, as illustrated in FIGS. 1 and 2, it may be assumed that the container 60 has already been lifted by the gantry crane 70 utilizing the sling structure 71. The bolsters 91 and 92 are removed from the pocket provided in the center sill 33 of the railway car 30. The bolster 91 is then mounted and secured in place upon the end portion of the center sill 33; and the bolster 92 is then mounted and secured in place upon the intermediate portion of the center sill 33. More particularly, the bolster 92 is located in sufficiently spaced-apart relation with respect to the previously loaded container 60 that an adequate distance will be obtained between the two containers 60 in their mounted positions. Incident to mounting and securing in place of each of the bolsters 91 and 92, it is necessarily connected at the opposite ends thereof to the two members 40 by virtue of the cooperation between the connecting elements 116 carried by the plates 115 provided on the opposite ends thereof and the connecting slots 46 provided in the top walls 44 of the members 40. Thus, each of the bolsters 91 and 92 in its mounted and secured position with respect to the top of the center sill 33 is connected to the members 40 for limited and cushioned longitudinal movements along the center sill 33. Also, the positions of the bolsters 91 and 92 are coordinate in the sense that the longitudinal spacing therebetween corresponds to the length of the container 60. The locking devices 120 carried by the bolsters 91 and 92 are operated to lock the bolsters in place with respect to the I-beams 35 of the center sill 33, as previously explained. Further, the gantry crane 70 is then operated to position the container 60 over the open end of the railway car 30 and in alignment with the two longitudinally spaced-apart bolsters 91 and 92; whereupon the gantry crane 70 is operated to lower the container 60 into its mounted position upon the two bolsters 91 and 92. After the container 60 is thus lowered into its mounted position upon the bolsters 91 and 92, the handles 110 are operated to thrust the lock pins 107 inwardly into the respective lock holes 108 respectively provided in the corner castings 61a, whereby the opposite ends of the container 60 are securely fastened and locked to the bolsters 91 and 92. The mounted and locked containers 60 and the mounted and secured bolsters 91 and 92 constitute a unit connected to the members 40 so that this unit in its mounted position is capable of limited longitudinal movements along the top of the center sill 33 and is afforded protection against the transmission thereto of severe longitudinal shocks from the center sill 33 because of the shock-absorbing characteristics of the members 40 with respect to the center sill 33. Finally, the sling structure 71 is disconnected from the top of the container 60.

Considering now the unloading of the container 60 from the left-hand end of the railway car 30, and assuming that the container 60 occupies its mounted position at this time, the two bolsters 91 and 92 are respectively operated to unlock the adjacent ends of the base 61. The sling structure 71 is secured to the top of the container 60, and the crane hook 72 is connected thereto, after the gantry crane 70 is operated into a position of overhead alignment with respect to the container 60. The gantry crane 70 is then operated to lift the container 60 from its supported position upon the bolsters 91 and 92, and is subsequently operated to remove the lifted container 60 from the side of the railway car 30. The bolsters 91 and 92 are disconnected and removed from the center sill 33; whereby they may then be returned into the pocket provided in the hollow center sill 33 until the use thereof is again subsequently required.

Again referring to FIGS. 7, 8, 10 and 11, the railway car 30 further comprises four jacks 141, 142, 143 and 144 respectively carried by the central portions of the tie members 80B, 80D, 80G and 80I, and respectively operatively associated with the four cradle structures 81, 82, 83 and 84. The four jacks 141, 142, 143 and 144 are manually operable; and for the purpose of selectively operating the same four manually operable crank handles 151, 152, 153 and 154 are respectively carried by the tie members 80C, 80E, 80H and 80J and respectively connected at the inner lower ends thereof to the jacks 141, 142, 143 and 144. Thus, by way of example, when the bolster 92 occupies its storage position on the associated cradle structure 92, as shown in full lines in FIG. 7, the same may be elevated to a position disposed out of the pocket in the center sill 33 and above the platform provided on the top of the center sill 33 by operation of the jack 142 via the crank 152 in an obvious manner. The head of the pack 142 is rotatable in a conventional manner, so as to accommodate rotation of the bolster 92 from its longitudinally oriented position into its laterally oriented position. Then the jack 142 may be operated via the crank 152 to lower the bolster 92 onto the platform defined upon the top of the center sill 33. In a reverse manner, when the bolster 92 is mounted on the platform defined on the top of the center sill 33 and positioned longitudinally above the associated jack 142, the jack 142 may be operated via the crank 152 to lift the bolster 92 clear of the platform and in elevated position so that it may be rotated from its laterally oriented position into its longitudinally oriented position. Then the jack 142 may be operated via the crank 152 to lower the bolster 92 into the pocket provided in the center sill 33 and into its storage position supported by the associated cradle structure 82 in an obvious manner.

Figure 21:
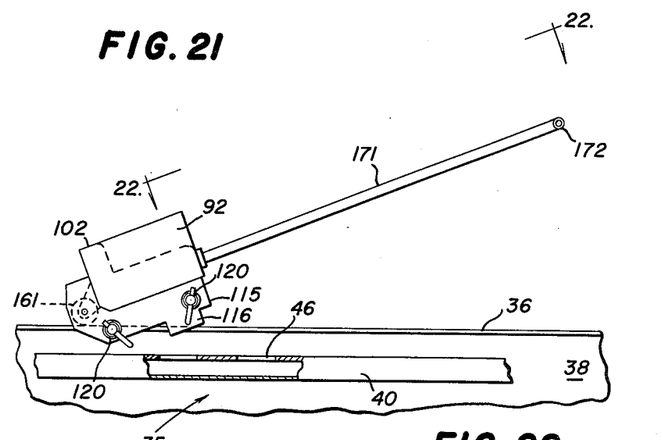
FIG. 21 is an enlarged fragmentary side view of the center sill and the adjacent end of the bolster, similar to FIG. 15, and illustrating a detachable handle-bar cooperating with the bolster for the purpose of facilitating rolling of the bolster along the center sill.
Figures 22, 23, 24, 25:
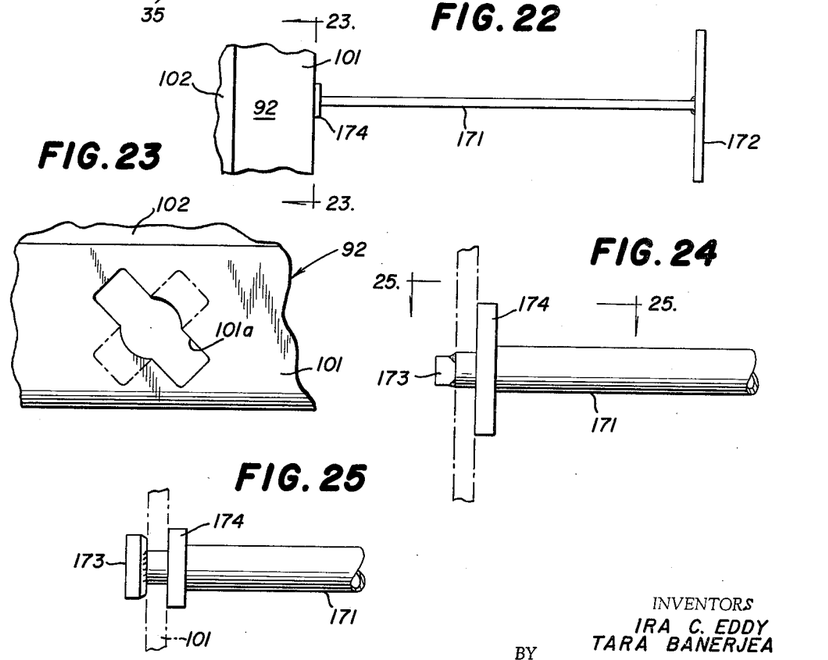
FIG. 22 is substantially an enlarged plan view of the elements, as shown in FIG. 21, this view being taken in the direction of the arrows along the line 22—22 in FIG. 21.
FIG. 23 is a greatly enlarged fragmentary front view of the central portion of the bolster, illustrating a keyhole slot provided therein for cooperation with the inner end of the handle-bar, this view being taken in the direction of the arrows along the line 23—23 in FIG. 22.
FIG. 24 is an enlarged fragmentary side view of the inner end of the handle-bar.
FIG. 25 is an enlarged fragmentary plan view of the inner end of the handle-bar, but this view taken in the direction of the arrows along the line 25—25 in FIG. 24.

For the purpose of facilitating movement of the bolster 92 along the platform on the top of the center sill 33 and between its storage and active positions, the same is provided with a pair of spaced-apart low rollers 161, as best shown in FIGS. 5, 13, 14, 15 and 21. Referring to FIGS. 13, 14 and 15, a pair of pins or shafts 162 are respectively arranged between the two plates 115 and two adjacent arms 163 respectively secured to the end section 102 of the bolster 92. Each of the rollers 161 is rotatably mounted upon a corresponding one of the shafts 162 and located between the adjacent plate 115 and the adjacent arm 163; whereby the roller 161 is spaced somewhat above the adjacent flange section 36b of the adjacent I-beam 35, when the bolster 92 occupies its mounted position on the platform provided on the top of the center sill 33 and supported by its skid plates 113 in engagement with the tops of the flanges 36, as clearly shown in FIGS. 13 and 14. This location of the roller 161 prevents normal engagement thereof with the adjacent flange section 36b, when the bolster 92 occupies its active position, so that the relative longitudinal movements of the bolster 92 with respect to the center sill 33 are sliding movements occurring at the skid plates 113, as previously noted. Now, when it is desired to move the bolsters 92 longitudinally along the platform provided on the top of the center sill 33, the bolster is tilted out of its normal position supported by the skid plates 133 toward the rollers 161, as shown in FIG. 21; whereby the weight of the bolster 92 is shifted from the skid plates 113 to the rollers 161; which tilting of the bolster 92 is referred to hereinafter as "rearward" tilting. Not only does rearward tilting of the bolster 92 effect disengagement of the skid plates 113 with the flanges 36 and engagement of the rollers 161 with the flanges 36, as noted above, it also causes the collecting lugs 116 carried by the lower portions of the plates 115 to disengage the respective slots 46 provided in the members 40, as shown in FIG. 21; whereby the bolster 92 in its rearwardly tilted position, as shown in FIG. 21, may be rolled in a ready manner in either direction longitudinally along the center sill 33.

For the purpose of facilitating rolling of the bolsters 91, 92, etc., along the center sill 33, a common handle bar 171, is provided as shown in FIGS 21 to 25, inclusive. The outer end of the bar 171 terminates in a hand grasp bar 172 to facilitate manipulation thereof; and the inner end of the bar 171 terminates in a rectangular key 173 having a length greater than the width thereof. Also, a collar 174 surrounds the inner end of the bar 171 adjacent to and somewhat outwardly of the key 173. The central portion of the front wall of the base section 101 of each of the bolsters 91, 92, etc., has a key-hole or key-slot 101a formed therein that is adapted removably to receive the key 173 provided on the inner end of the common bar 171; whereby the inner end of the bar 171 may be detachably connected to any one of the bolsters 91, etc., in an obvious manner. When the bar 171 is detachably connected to the bolster 92, it is apparent that the bolster 92 may be moved in a ready manner between the storage and active positions, as required. Also, of course, when the handle-bar 171 is not in use it too may be stored in the pocket provided in the center sill 33.

Again referring to FIGS. 7 and 8, it is noted that suitable grid structures 181, 182 and 183 are arranged in the bottom of the center sill 33, so that the person who is to operate the adjacent cranks 151, 152 and 153 may step down into the hollow center sill 33 in order to render more convenient the manual operation of the corresponding jacks 141, 142 and 143.

While the bolsters 91, 92, 93 and 94 are identical to each other, as previously explained, the bolster of each pair 91, 92 and 93, 94 are placed, as a matched pair, in their coordinate active positions on the center sill 33, as shown in FIG. 1. Specifically, referring to FIG. 2, the two bolsters 91 and 92 are turn incident to removal thereof from their storage positions, so that they face each other in order properly to receive the base 61 of the container 60. Also, to facilitate the locations of the bolsters 91 and 92 in their coordinate active positions, two corresponding white stripes or marks may be carried by the members 40 indicating the slots 46 into which the lugs 116 carried by plates 115 of the two bolsters 91 and 92 are to be inserted.

Again referring to FIG. 9, the opposite top end portions of each of the elements 83a of the cradle structure 83, respectively carry a pair of chock blocks 191 that are downwardly and inwardly inclined, so as to insure proper final seating of the associated bolster 93 in its storage position; whereby the same is accurately longitudinally oriented. Also, it is noted that each of elements 83a of the cradle structure 83 is substantially L-shaped, so that the flanges of the two elements 83a are respectively operatively associated with the adjacent pairs of locking devices 120, when the bolster 93 occupies its storage position. Thus, the locking devices 120 may be actuated into their lock positions, so as securely to lock the bolster 93 in place in its storage position upon the associated cradle structure 83. This arrangement prevents shifting and rattle of the bolster 93 in its storage position, when the railway car is in service that does not require the use of the pair of bolsters 93, 94.

Of course, the railway car 30 has utility for transporting other ladings than the containers 60; whereby in this case, the bolsters 91, etc., are placed in their storage positions. However, the four bolsters 91, 92, 93 and 94, together with the handle-bar 171, are always kept with the railway car 30, so that when use thereof is required they are at hand.

In view of the foregoing descriptions of the manually operable jacks 141, etc., the manually rollable bolsters 91, etc., and the handle-bar 171, it will be appreciated that one person can readily manipulate the bolsters 91, etc., as required, moving the same between their storage and active positions, without great physical exertion. Also, this same person can direct the operation of the gantry crane 70; whereby the container 60 may be readily loaded and unloaded with respect to the railway car 30, by the joint supervision and control of the one "car man" and the crane operator; with the result that the containers 60 may be rapidly and economically loaded and unloaded with respect to the railway car 30.

In a constructional example of the railway car 30: the flanged rail wheels 32 carried by the trucks 31 are of standard rail gauge; the longitudinal distance between the striker plates carried at the opposite ends of the center sill 33 is 85 ft. 8 in.; the lateral distance between the outside edges of the top flanges 36 of the I-beams 35 incorporated in the center sill 33 is 3 ft. 3⅛ in. ±¼ in.; the lateral distance between the inside edges of the top flanges 36 is 1 ft. 5¹⁵⁄₁₆ in. ±¼ in.; the vertical distance between the top of the track rails 34 and the top of the flanges 36 is 3 ft. 8½ in.; and the other dimensions involved are generally related to those noted above in accordance with the scales of the various figures of the drawings. Also, each of the freight containers 60 has an outside length between the opposite ends thereof of approximately 40 ft.

In view of the foregoing it is apparent that there has been provided in a freight transportation system, including a railway car and a plurality of freight containers, an improved arrangement for effecting overhead loading and overhead unloading of the freight containers with respect to the railway car. Also, there has been provided an improved arrangement, including a pair of bolsters, for mounting each freight container upon the railway car and for effecting shock-absorption between the railway car and the mounted container, wherein the two bolsters are independently removably mounted upon and secured to the railway car, wherein the two bolsters are independently locked to the opposite ends of the base of the freight container in its mounted position, wherein the two bolsters in their mounted and secured positions and the freight container in its mounted and locked position constitute a unit mounted for longitudinal movements along the railway car, and wherein the mounted unit is connected to the railway via shock-absorbing facility arranged therebetween. Also, there has been provided improved facility for storing the bolsters, when they are not in use, in the center sill of the railway car, and improved facility for manipulating and moving the bolsters between their storage positions and their active positions mounting the freight container upon the railway car; wherein one person may readily effect the required manipulations and movements of the bolsters, without the exertion of great physical efforts, and in a simple and rapid manner.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A railway car especially adapted to carry removable freight containers; said railway car comprising a pair of longitudinally spaced-apart running gears such having rail wheels, an elongated longitudinally extending narrow beam bridging said running gears and lying between the planes of the inner sides of the rail wheels of said running gears, said beam including a pair of elongated longitudinally extending structural members arranged in laterally spaced-apart relation and defining an elongated longitudinally extending narrow pocket therebetween and having a corresponding elongated longitudinally extending narrow top opening into said pocket, the tops of said members respectively carrying a pair of flanges defining a substantially horizontal platform on top of said beam, a pair of cradle structures arranged within said pocket and disposed in longitudinally spaced-apart relation with respect to each other, a pair of elongated portable bolsters, each of said bolsters having a width between the opposite sides thereof that is somewhat narrower than said top opening, whereby each of said bolsters when oriented in the longitudinal direction may be passed in either direction through said top opening between the interior and the exterior of said pocket, each of said bolsters having a length between the opposite ends thereof that is somewhat greater than the width of said platform, whereby each of said bolsters when disposed exteriorly of said pocket and oriented in the lateral direction may be supported upon said platform with the opposite ends thereof respectively projecting laterally outwardly beyond the opposite sides of said platform, said pair of bolsters having a corresponding pair of storage positions wherein they are oriented in the longitudinal direction and arranged within said pocket and respectively supported upon said pair of cradle structures, means carried by each one of said cradle structures for holding in place the corresponding one of said bolsters supported thereby in its storage position, said pair of bolsters having a corresponding pair of coordinate active positions wherein they are oriented in the lateral direction and arranged exteriorly of said pocket and respectively supported upon said platform and located in predetermined longitudinally spaced-apart relation, means carried by said beam for restraining, said pair of bolsters in their coordinate active positions, and a pair of jacks arranged within said pocket and respectively associated with said cradle structures, each one of said jacks being selectively operative to elevate the adjacent one of said bolsters from the associated one of said cradle structures and from its storage position into an elevated position disposed above said platform and to accommodate rotation of said one bolster in its elevated position from its longitudinal orientation into its lateral orientation and then to lower said one bolster into a supported position on said platform so that said one bolster may then be moved longitudinally along said platform into its active position, each one of said jacks also being selectively operative to elevate one of said bolsters from a supported position upon said platform disposed in superimposed relation with said one jack and into an elevated position disposed above said platform and to accommodate rotation of said one bolster in its elevated position from its lateral orientation into its longitudinal orientation and then to lower said one bolster onto the associated one of said cradle structures and thus into its storage position, and means carried by said pair of bolsters in their coordinate active positions for receiving and for supporting the opposite ends of a freight container mounted thereupon, each one of said bolsters carrying first locking mechanism for selectively locking and unlocking said one bolster in its active position to said beam, each one of said bolsters carrying second locking mechanism for selectively locking and unlocking said one bolster to the adjacent end of a freight container mounted thereupon.

2. The railway car set forth in claim 1, wherein each of said jacks is of the manually operable type.

3. The railway car set forth in claim 1, and further comprising a pair of manually operable handles respectively operatively associated with said jacks for selectively operating the same, each one of said handles being disposed within said pocket and accessible from the exterior through said top opening so as to accommodate the selective operations of the associated one of said jacks.

4. The railway car set forth in claim 1, wherein each one of said bolsters further carries a pair of spaced-apart rollers adapted respectively to engage said flanges when said one bolster is laterally oriented and occupies a supported position on said platform so as to facilitate rolling movements of said one bolster longitudinally along said platform.

5. The railway car set forth in claim 4, wherein said pair of rollers carried by each one of said bolsters are arranged above the bottom surface of said one bolster so that when said one bolster is laterally oriented and occupies a supported position on said platform said one bolster unit must be rotated or tipped about its longitudinal axis to lower said pair of rollers into respective engagements with said flanges to facilitate the rolling movements of said one bolster longitudinally along said platform.

6. The railway car set forth in claim 4, and further comprising an elongated handle-bar device selectively connectible and disconnectible with respect to either one of said bolsters to facilitate in its connected position rolling movements of said one bolster longitudinally along said platform.

References Cited by the Examiner
UNITED STATES PATENTS

| | | | |
|---|---|---|---|
| 1,403,568 | 1/1922 | Rodowicz | 105—366 |
| 1,408,414 | 2/1922 | Smith | 105—366 |
| 1,675,701 | 7/1928 | Fitch | 105—366 |
| 3,050,320 | 8/1962 | Clejan | 105—368 |
| 3,102,646 | 9/1963 | Clejan | 105—368 |
| 3,144,838 | 8/1964 | Shaver et al. | 105—368 |
| 3,161,151 | 12/1964 | Johansson | 105—366 |
| 3,167,028 | 1/1965 | Gutridge et al. | 105—366 |

ARTHUR L. LA POINT, *Primary Examiner.*

LEO QUACKENBUSH, MILTON BUCHLER,
*Examiners.*